3,459,744
v-TRIAZOLE-(2)-STILBENES
Alfons Dorlars and Otto Neuner, Leverkusen, and Rolf Pütter, Duesseldorf, Germany, assignors to Farbenfabriken Bayer Aktiengesellschaft, Leverkusen, Germany, a corporation of Germany
No Drawing. Filed Jan. 6, 1966, Ser. No. 518,991
Claims priority, application Germany, Jan. 9, 1965, F 44,918
Int. Cl. C07d 55/00, 55/02
U.S. Cl. 260—240         6 Claims

ABSTRACT OF THE DISCLOSURE

Symmetrical and unsymmetrical v-triazole - (2) stilbenes having utility as brightening agents.

---

The present invention relates to brighteners; more particularly it concerns brighteners consisting essentially of blue fluorescent v - triazolyl - (2) - stilbene compounds of the formula

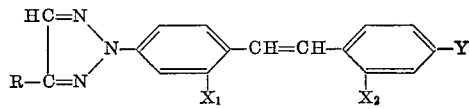

wherein R denotes hydrogen, halogen, a cyano or an acylated amino group, whilst $X_1$ and $X_2$ each individually stands for hydrogen or a solubilising group such as a sulpho or carboxyl group, or for a sulphonamide group, a sulphonic acid ester group, a carboxylamide group, a carboxylic acid ester group, an alkyl or aryl-sulphone group or a cyano group, and Y represents hydrogen, halogen, cyano, an acylated amino group or an optionally substituted v-triazolyl group.

The brighteners of the present invention are suitable for brightening a wide variety of materials, for instance for brightening cellulose materials such as cotton and paper, or brightening wool, and also for brightening synthetic materials such as fibers, threads, films or plastic masses from polyamides, polyesters, polyacrylonitrile and polyvinyl chloride as well as for brightening varnishes from cellulose acetate, or for brightening soap. Consideration is preferably given to those v-triazolyl-(2)-stilbene compounds for brightening cotton and synthetic polyamides which correspond to the specified formula when Y stands for an optionally substituted v-triazolyl-(2) radical and $X_1$ as well as $X_2$ denote a sulpho group, whilst compounds of the specified formula which are free from sulpho groups are particularly suitable for brightening materials of polyesters or polyvinyl chloride, as well as for brightening varnishes of cellulose acetate.

The brighteners can be applied by the usual method, for instance in the form of their aqueous solutions or dispersions, or in the form of their solutions in organic solvents such as ethylene glycol monomethyl ether. If desired the brighteners may also be applied in conjunction with detergents, or they may be added to casting compositions employed for the production of films or threads. The necessary amounts can in any given case be readily established during preliminary experiments: in general, proportions of 0.1 to 1%, referred to the material which is to be brightened, have proved to be sufficient.

The brighteners according to the invention which have a symmetrical structure are for instance available by tetrazotising stilbene compounds of the formula

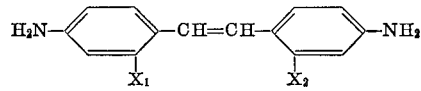

wherein $X_1$ and $X_2$ have the above specified significance, combining the resultant tetrazo compounds with nitroacetaldoxime, dehydrating the resultant disazo compounds to form the nitro-triazole compounds, thereafter reducing the nitro groups and then converting the amino groups in the resultant amino-triazole compounds to acylated amino groups or to hydrogen, halogen or cyano groups according to known methods. Brighteners according to the invention which have an asymmetrical structure are for instance available by converting the amino group in stilbene compounds of the formula

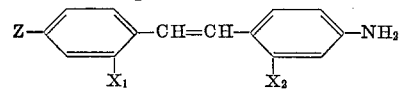

wherein $X_1$ and $X_2$ have the above specified significance whilst the substituent Z stands for a group which can be transformed to a free amino group, for instance a nitro group or an acylated amino group to the substituent Y of the above stated significance according to known methods and subsequently transforming the substituent Z to the free amino grouping before converting the latter to the grouping

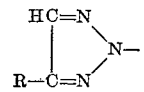

wherein R has the above specified significance, according to the method described above. In order to prepare those brighteners with an unsymmetrical structure which correspond to the formula given on page 1 wherein Y stands for hydrogen, halogen or a cyano group, it is also possible to use stilbene compounds of the formula

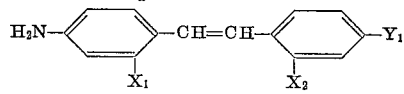

wherein $X_1$ and $X_2$ have the above specified significance whilst $Y_1$ represents hydrogen, halogen or a cyano group, as the starting material and then to convert the amino group to the grouping

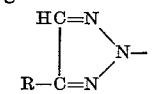

wherein R has the above specified significance, by the method described above.

The following examples serve to illustrate the invention without, however, limiting its scope.

Example 1

Unbleached cotton yarn is treated at 40–50° C. for 30 minutes at a liquor-to-goods ratio of 20:1 with an aqueous liquor which contains, per litre, 0.06 g. of the brightener described below. After rinsing and drying, the treated yarn exhibits a clear neutral brightening effect with good fastness to light and to chlorite.

The employed brightener was prepared by the following method.

370 g. 4,4'-diaminostilbene-2,2'-disulphonic acid (1 mole) was diazotised as usual, and the resultant acidic diazo suspension was treated at 15° C. with an aqueous suspension of 210 g. nitro-acetaldoxime (2 moles) whilst the pH value was maintained at about 4 by the addition of sodium carbonate. After coupling had been completed, the resultant azo compound was filtered off with suction and suspended in 14 litres water. The suspension was treated with sufficient concentrated sodium hydroxide solution to achieve a pH value of 9 to 9.5 and thus convert the suspension to a solution. The resultant solution was then treated at 25° C. with 400 ml. acetic anhydride and, at the same time, with sufficient concentrated sodium hydroxide solution to maintain the adjusted pH value of 9 to 9.5 whilst stirring vigorously. The separated reaction product was filtered off with suction and purified by redissolving it in dilute sodium chloride solution. The sodium salt of 4,4'-bis-[4-nitro-1,2,3-triazolyl-(2)-]-stilbene-2,2'-disulphonic acid thus obtained was thereafter gradually introduced at 95 to 100° C. into a mixture of 750 g. iron filings pickled with hydrochloric acid, 1 litre water and 12 ml. glacial acetic acid. When reduction of the nitro group had been completed, the reaction mixture was rendered alkaline with sodium carbonate and filtered. The residue on the filter was repeatedly extracted with hot water; the extracts and filtrate were combined and treated with sodium chloride in order to complete the separation of the reaction product. The sodium salt of 4,4'-bis-[4-amino-1,2,3-triazolyl-(2)]-stilbene-2,2'-disulphonic acid which separates was filtered off with suction and dried. 11 g. of this compound were then suspended in 100 ml. pyridine and gradually treated at 35 to 40° C. with 5 ml. benzoyl chloride whilst stirring vigorously. As soon as no more amino groups could any longer be detected, the pyridine was removed by steam distillation, the residue was treated with some sodium carbonate and the separated almost colourless sodium salt of 4,4'-bis-[4-benzoylamino-1,2,3-triazolyl-(2)]-stilbene-2,2'-disulphonic acid was filtered off with suction at about 50° C., washed with dilute sodium chloride solution and thereafter dried.

When the sodium salt of 4,4'-bis-[4-benzoylamino-1,2,3-triazolyl-(2)]-stilbene-2,2'-disulphonic acid is replaced by the use of the sodium salt of 4,4'-bis-[4-p-toluylamino-1,2,3-triazolyl-(2)]-stilbene-2,2'-disulphonic acid, of the sodium salt of 4,4'-bis-[4-p-chlorobenzoylamino-1,2,3-triazolyl-(2)]-stilbene-2,2'-disulphonic acid or the sodium salt of 4,4'-bis-[4-m-chlorobenzoylamino-1,2,3-triazolyl-(2)]-stilbene-2,2'-disulphonic acid as the brightener during the above described treatment of the cotton yarn, a clear neutral brightening effect is again obtained with equally good fastness to light and to chlorite. These brighteners are obtainable from the above described sodium salt of 4,4'-bis-[4-amino-1,2,3,-triazolyl-(2)]-stilbene-2,2'-disulphonic acid by its acylation with p-toluyl chloride, p-chlorobenzoyl chloride and m-chlorobenzoyl chloride, respectively, in pyridine.

Example 2

Unbleached cotton cheesecloth is treated at 85 to 95° C. for one hour at a liquor-to-goods ratio of 20:1 with an aqueous liquor which contains, per litre, 0.08 g. of the sodium salt of 4,4'-bis-[4-m-toluylamino-1,2,3-triazolyl-(2)]-stilbene-2,2'-disulphonic acid as brightener and 2 g. sodium chlorite. After rinsing and drying, the treated material exhibits an excellent brightening effect.

The employed brightener is obtainable by the reaction of the sodium salt of 4,4'-bis-[4-amino-1,2,3-triazolyl-(2)]-stilbene-2,2'-disulphonic acid, described in Example 1, with m-toluyl chloride in pyridine.

Example 3

100 g. curd soap are mixed with 0.1 g. of the brightener described below so as to form a homogeneous mass. When the soap has thus been treated, its appearance in daylight is much whiter than that of untreated soap.

The employed brightener was prepared by the following method:

1 mole of the sodium salt of 4-[5-sulpho-naphtho(1,2:4',5')-triazolyl-(2')]-4' - amino - stilbene - 2,2'-disulphonic acid was diazotised as usual and the resultant acidic diazo suspension was combined at 15° C. with an aqueous suspension of 1.05 moles nitro-acetaldoxime at pH 4.5. After coupling had been completed, the resultant azo compound was filtered off with suction and converted via the sodium salt of 4-[5-sulpho-naphtho(1,2:4',5')-triazolyl-(2')]-4'-[4'-nitro-1,2,3 - triazolyl - (2)]-stilbene-2,2'-disulphonic acid to form the sodium salt of 4-[5-sulpho-naphtho(1,2:4',5') - triazolyl - (2')]-4' - [4'-amino-1,2,3-triazolyl-(2)]-stilbene-2,2'-disulphonic acid by the method described in Example 1; this compound which contains amino groups was then diazotised as usual and the resultant diazo suspension was gradually added to a solution of cuprous chloride in hydrochloric acid which had been heated to 60° C. The sodium salt of 4-[5-sulpho-naphtho(1,2:4',5')-triazolyl-(2')] - 4' - [4'-chloro-1,2,3-triazolyl-(2)]-stilbene-2,2'-disulphonic acid which separates is filtered off, purified by redissolving in dilute sodium chloride solution and then dried.

Example 4

White washing is washed at 90 to 100° C. and at a liquor-to-goods ratio of 20:1 in a washing liquor which contains, per litre, 10 g. of a commercial anion-active detergent and 0.05 g. of the sodium salt of 4,4'-bis-[4-(2,4-dichlorobenzoylamino)-1,2,3 - triazolyl - (2)]-stilbene-2,2'-disulphonic acid as the brightener. After rinsing and drying, the laundry thus treated exhibits an excellent brightening effect.

The employed brightener is obtainable by the reaction of the sodium salt of 4,4'-bis-[4-amino-1,2,3-triazolyl-(2)]-stilbene-2,2'-disulphonic acid described in Example 1 with 2,4-dichlorobenzoyl chloride in pyridine.

Example 5

Fabric of fibres made from hexamethylene diamine adipate from from poly-ε-caprolactam are treated at 80 to 90° C. for 30 minutes at a liquor-to-goods ratio of 40:1 in an aqueous liquor which contains, per litre, 0.2 g. of one of the brighteners listed below as (a) to (f). After rinsing and drying, the fabrics exhibit a very strong, clear and neutral brigtening effect having good fastness to light and to chlorite.

The brighteners employed above consist of the following compounds:

(a) Sodium salt of 4,4'-bis-[4-pivaloylamino-1,2,3-triazolyl-(2)]-stilbene-2,2'-disulphonic acid,
(b) Sodium salt of 4,4'-bis-[4-o-toluylamino-1,2,3-triazolyl-(2)]-stilbene-2,2'-disulphonic acid,
(c) Sodium salt of 4,4'-bis-[4-mesitoylamino-1,2,3-triazolyl-(2)]-stilbene-2,2'-disulphonic acid,
(d) Sodium salt of 4,4'-bis-[4-o-chlorobenzoylamino-1,2,3-triazolyl-(2)]-stilbene-2,2'-disulphonic acid,
(e) Sodium salt of 4-[1,2,3-triazolyl-(1)]-4'-[4-benzoylamino-1,2,3-triazolyl-(2)]-stilbene-2,2'-disulphonic acid,
(f) Sodium salt of 4-o-anisoylamino-4'-[4-benzoylamino-1,2,3-triazolyl-(2)]-stilbene-2,2'-disulphonic acid.

The brighteners listed at (a), (b), (c) and (d) were prepared by the reaction of the sodium salt of 4,4'-bis-[4-amino-1,2,3-triazolyl-(2)]-stilbene - 2,2' - disulphonic acid, described in Example 1, with trimethyl-acetyl chloride, o-toluyl chloride, 2,4,6-trimethylbenzoyl chloride and o-chlorobenzoyl chloride, respectively, in pyridine.

The brightener listed at (e) were prepared by the following method:

4-[1,2,3-triazolyl-(1)]-4'-aminostilbene - 2,2' - disulphonic acid was diazotised as usual and the resultant diazo suspension was treated at 15° C. and at a pH value of about 4 with an aqueous suspension of an equimolar proportion of nitro-acetaldoxime. After coupling had been completed, the resultant azo compound was filtered off with suction and converted via the sodium salt of 4-[1,2,3-triazolyl-(1)]-4'-[4-nitro - 1,2,3-triazolyl - (2)]-stilbene-2,2'-disulphonic acid to form the sodium salt of 4-[1,2,3-triazolyl-(1)]-4'-[4-amino-1,2,3 - triazolyl - (2)]-stilbene-2,2'-disulphonic acid by the method described in Example 1, and this compound was then acylated with benzoyl chloride in pyridine.

The brightener listed at (f) was prepared by the following method:

4-o-anisoylamino-4'-amino-stilbene - 2,2' - disulphonic acid was diazotised as usual and the resultant acidic diazo suspension was treated at 15° C. and at a pH value of about 4 with an aqueous suspension of an equimolar proportion of nitro-acetaldoxime. After coupling had been completed, the resultant azo compound was filtered off with suction and converted via the sodium salt of 4-o-anisoylamino-4'-[4-nitro-1,2,3-triazolyl-(2)] - stilbene-2,2-disulphonic acid to form the sodium salt of 4-o-anisoyl-amino-4'-[4-amino-1,2,3-triazolyl-(2)] - stilbene - 2,2'-disulphonic acid by the method described in Example 1, and this compound was then acylated with benzoyl chloride in pyridine.

Example 6

65 parts by weight of a polyvinyl chloride with a K-value of about 72–74 prepared by emulsion polymerization, 35 parts by weight of dioctyl phthalate, 2 parts by weight of a commercial organic stabilizer containing tin, 1 part by weight of titanium dioxide (rutile) and 0.1 part by weight of 4,4'-bis-[4-isobutyramido - 1,2,3 - triazolyl-(2)]-stilbene-2,2'-bis-sulphoethylamide as the brightener, are rolled at 165° C. for about 5 minutes on hot rolls with slight friction, with variations in the width of the roll gap, and the resultant fleece is drawn through a four-roll calendar to form a sheet of thickness about 300µ. The sheet then exhibits a strong brightening effect.

The employed brightener was prepared by the following method:

456 g. of the sodium salt of 4,4'-bis-[4-nitro-1,2,3-triazolyl-(2)]-stilbene-2,2'-disulphonic acid described in Example 1 were introduced into a mixture of 2 l. of phosphorus oxychloride and 400 g. of phosphorus pentachloride. The mixture was gradually heated with stirring until the phosphorus oxychloride began to boil and then stirred at this temperature for a further 4 hours; the evolution of hydrogen chloride was then finished. The phosphorus oxychloride was distilled off under reduced pressure and the residue stirred with cold water. The yellow 4,4'-bis-[4-nitro-1,2,3-triazolyl-(2)]-stilbene - 2,2' - disulphochloride thus obtained was filtered off with suction, washed with water until free from acid and stirred with an aqueous ethylamine solution (excess) at 40° C. for about 4 hours. The resulting nitro-sulphonamide was filtered off with suction, washed, dissolved in dimethylformamide and reduced with hydrogen in the presence of Raney-nickel catalyst to the amino-sulphonamide. After removing the catalyst and adding pyridine, the aminosulphonamide was acylated with isobutyric acid chloride without isolation. As soon as any free amino groups could no longer be detected the 4,4'-bis-[4-isobutyramido-1,2,3-triazolyl-(2)]-stilbene-2,2'-bis-sulphoethylamide was precipitated by dropwise adding water and then purified by recrystallisation from dimethylformamide.

When instead of the brightener described above one of the compounds listed below as (a) to (m) is employed, likewise strong brightening effects are obtained. These compounds correspond to the general formula

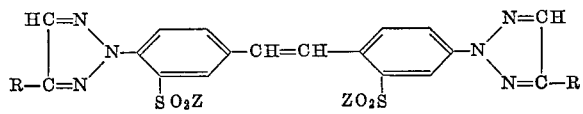

wherein R and Z have the following meaning:

| | R | Z |
|---|---|---|
| (a) | $CH_3$—CONH— | —NH—$C_2H_5$ |
| (b) | $CH_3$—CONH— | —N($CH_2$—$CH_2$—OH)$_2$ |
| (c) | $CH_3$—CONH— | 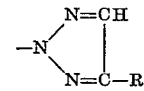 |
| (d) | $CH_3$—CONH— | —O—⟨phenyl⟩ |
| (e) | $C_2H_5$—CONH— | —NH—$C_2H_5$ |
| (f) | $C_2H_5$—CONH— | —NH—$CH_2$—$CH_2$—OH |
| (g) | n—$C_3H_7$—CONH— | —N($C_3H_7$)$_2$ |
| (h) | iso—$C_3H_7$—CONH— | —NH—($CH_2$)$_2$—$OCH_3$ |
| (i) | iso—$C_3H_7$—CONH— | —NH—($CH_2$)$_3$—COOH |
| (k) | ($CH_3$)$_3$C—CONH— | —N($C_2H_5$)$_2$ |
| (l) | ($CH_3$)$_3$C—CONH— | —N(CH$_3$)(CH$_2$—CH$_2$—OCH$_3$) |
| (m) | Cl—$CH_2$—$CH_2$—CONH— | —O—⟨phenyl-CH$_3$⟩ |

The compounds (a) to (m) can be prepared in the following manner:

The 4,4'-bis-[4-nitro-1,2,3-triazolyl-(2)] - stilbene - 2,2'-disulphochoride is reacted with the relevant amine or alkali phenolate in the manner described above, thereupon the nitro group is reduced to the amino group and the amino group is then acylated with the corresponding carboxylic acid chloride or anhydride.

We claim:
1. A compound of the formula

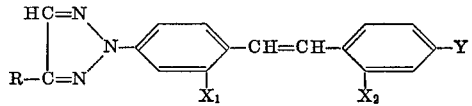

wherein
X$_1$ and X$_2$ are individually members selected from the group consisting of a sulfo, sulfonamido, lower alkyl sulfonamido, hydroxy lower alkyl sulfonamido, alkoxy lower alkyl sulfonamido, carboxy lower alkyl sulfonamido, di-lower alkyl sulfonamido, sulfonic acid phenyl ester, sulfonic acid lower alkoxy phenyl ester and sulfomorpholinyl;
Y is a benzoylamino; halobenzoylamino, methoxy benzoylamino, methyl benzoylamino or $$-N\begin{array}{c}N=CH\\|\\N=C-R\end{array}$$

wherein
R is a halo, cyano, lower alkyl carbonylamino, benzoylamino, or benzoylamino substituted by at least one substituent selected from the group consisting of halo, lower alkyl and lower alkoxy;
and the corresponding water-soluble salts thereof.

2. A compound of claim 1 wherein
X and X$_2$ are sulfo or sodium sulfo;
Y is a 1,2,3-triazolyl-(2) having as substituent in the 4-position a member selected from the group consisting of benzoylamino, p-toluylamino, m-toluylamino, p-chlorobenzoylamino, m-chlorobenzoylamino, 2,4-dichlorobenzoylamino, and 4-pivaloylamino, and
R is a member selected from the group consisting of benzoylamino, p - toluylamino, p - chlorobenzoylamino, m-chlorobenzoylamino, 2,4-dichlorobenzoylamino, 4-pivaloylamino, and lower alkyl-carbonylamino.

3. 4,4''-bis-[4 - benzoylamino - 1,2,3 - triazolyl-(2)]-stilbene-2,2'-disulphonic acid.

4. 4,4'-bis-[4-p-toluylamino - 1,2,3, - triazoyl-(2)]-stilbene-2,2'-disulphonic acid.

5. The sodium salt of 4,4'-bis-[4-p-chlorobenzoyl-amino-1,2,3 - triazolyl-(2)]-stilbene-2,2'-disulphonic acid.

6. Sodium salt of 4-[5-sulpho-naphtho-(1,2:4',5')-triazolyl-(2')]-4'-[4'-chloro-1,2,3 - triazolyl-(2)]-stilbene-2,2'-disulphonic acid.

References Cited

UNITED STATES PATENTS 2,901,476   8/1959   Gold et al. _____ 260—249

FOREIGN PATENTS 763,696   12/1956   Great Britain.
787,429   12/1957   Great Britain.

JOHN D. RANDOLPH, Primary Examiner

U.S. Cl. X.R.

106—176; 117—33; 252—117, 152, 301; 260—37, 87, 141, 465, 508